(12) United States Patent
Falkner et al.

(10) Patent No.: US 8,430,492 B2
(45) Date of Patent: *Apr. 30, 2013

(54) INKJET PRINTING FLUID

(75) Inventors: Catherine A. Falkner, Rochester, NY (US); Thomas B. Brust, Webster, NY (US); Yongcai Wang, Rochester, NY (US); Hwei-Ling Yau, Rochester, NY (US); Douglas R. Robello, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/871,982

(22) Filed: Aug. 31, 2010

(65) Prior Publication Data

US 2012/0050380 A1    Mar. 1, 2012

(51) Int. Cl.
*G01D 11/00* (2006.01)

(52) U.S. Cl.
USPC .............................. 347/100; 347/95; 523/160

(58) Field of Classification Search .................. 347/100, 347/95, 96, 101, 20, 21, 9, 88, 99, 105; 106/31.6, 106/31.27, 31.13; 523/160, 161
See application file for complete search history.

(56) References Cited

U.S. PATENT DOCUMENTS 4,335,029 A     6/1982 Dabi et al.
4,614,948 A     9/1986 Katerberg et al.

(Continued)

FOREIGN PATENT DOCUMENTS

EP    1219449    7/2002
EP    1454968    9/2004

(Continued)

*Primary Examiner* — Manish S Shah
(74) *Attorney, Agent, or Firm* — Andrew J. Anderson

(57) ABSTRACT

An inkjet printing fluid composition including water and a water dispersible polyurethane additive of the general formula of (I)

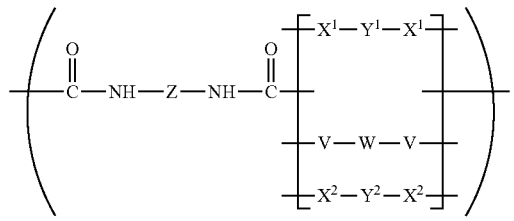

wherein Z is the central portion of a monomer unit that is the polymerization product of a diisocyanate; $X^1$—$Y^1$—$X^1$ represents one or more soft segments wherein $Y^1$ represents the central portion of a unit that is the polymerization product of a diamine or diol prepolymer having a molecular weight of greater than 300 Daltons; W is the central portion of one or more units containing an acid group; $X^2$—$Y^2$—$X^2$ represents one or more hard segments wherein $Y^2$ represents the central portion of a unit that is the polymerization product of a $C_2$-$C_8$ diol or diamine having a molecular weight of less than 250 Daltons; and $X^1$, V and $X^2$ can be the same or different and are an —O— or —N— atom; and further wherein the polyurethane additive has a weight average molecular weight of at least 6,000 Daltons and a sufficient number of acid groups to provide an acid number greater than 35, and the one or more $X^2$—$Y^2$—$X^2$ hard segments are present at from 1 wt % to less than 13 wt % of the polyurethane additive. Also disclosed is a method for printing an inkjet image including I) providing an inkjet printing fluid according to the invention; and II) jetting the inkjet printing fluid in the form of ink drops onto a recording element to form a printed image.

20 Claims, 2 Drawing Sheets

U.S. PATENT DOCUMENTS

| | | | |
|---|---|---|---|
| 4,734,711 A | | 3/1988 | Piatt et al. |
| 4,971,527 A | | 11/1990 | Dick |
| 5,389,430 A | * | 2/1995 | Yilgor et al. .................... 442/76 |
| 5,394,177 A | | 2/1995 | McCann et al. |
| 6,136,890 A | | 10/2000 | Carlson et al. |
| 6,174,052 B1 | | 1/2001 | Eremity et al. |
| 6,268,101 B1 | * | 7/2001 | Yacobucci et al. ............ 347/106 |
| 6,533,408 B1 | * | 3/2003 | Erdtmann et al. ............ 347/100 |
| 6,588,888 B2 | | 7/2003 | Jeanmaire et al. |
| H2113 H | | 1/2005 | Nichols et al. |
| 6,863,385 B2 | | 3/2005 | Jeanmarie et al. |
| 6,943,037 B2 | | 9/2005 | Anagnostopoulos et al. |
| 8,187,371 B2 | * | 5/2012 | Brust et al. ................. 106/31.25 |
| 2002/0175983 A1 | | 11/2002 | Ishikawa et al. |
| 2004/0085419 A1 | | 5/2004 | Yau et al. |
| 2004/0130608 A1 | | 7/2004 | Campbell et al. |
| 2004/0229976 A1 | | 11/2004 | Kakiuchi et al. |
| 2004/0242726 A1 | | 12/2004 | Waki et al. |
| 2006/0100306 A1 | | 5/2006 | Yau et al. |
| 2006/0100308 A1 | | 5/2006 | Yau et al. |
| 2008/0207811 A1 | | 8/2008 | Brust et al. |
| 2009/0169749 A1 | * | 7/2009 | Brust et al. .................... 427/256 |
| 2010/0055322 A1 | | 3/2010 | Brust et al. |
| 2012/0050415 A1 | | 3/2012 | Falkner et al. |

FOREIGN PATENT DOCUMENTS

| | | |
|---|---|---|
| EP | 1 013 450 | 7/2006 |
| JP | 2008-024733 | 2/2008 |
| WO | 99/41320 | 8/1999 |

* cited by examiner

INKJET PRINTING FLUID

CROSS-REFERENCE TO RELATED APPLICATIONS

Reference is made to commonly assigned U.S. application Ser. No. 12/872,018, filed Aug. 31, 2010 (Publication No. 2012/0050415), directed towards "Recirculating Fluid Printing System and Method," the disclosure of which is incorporated by reference herein in its entirety.

FIELD OF THE INVENTION

The invention relates generally to the field of inkjet printing fluids, including pigmented and clear inks, and in particular to inks which are useful for thermal inkjet printing and continuous inkjet printing. More specifically, the invention relates to pigmented and clear inks for high-speed inkjet printing which result in durable images.

BACKGROUND OF THE INVENTION

Inkjet printing is a non-impact method for producing printed images by the deposition of ink droplets in a pixel-by-pixel manner to an image-recording element in response to digital signals. There are various methods that can be used to control the deposition of ink droplets on the image-recording element to yield the desired printed image. In one process, known as drop-on-demand inkjet, individual droplets are projected as needed onto the image-recording element to form the desired printed image. Common methods of controlling the ejection of ink droplets in drop-on-demand printing include thermal bubble formation (thermal inkjet (TIJ)) and piezoelectric transducers. In another process known as continuous inkjet (CIJ), a continuous stream of droplets is generated and expelled in an image-wise manner onto the surface of the image-recording element, while non-imaged droplets are deflected, caught, and recycled to an ink sump. Inkjet printers have found broad applications across markets ranging from desktop document and photographic-quality imaging, to commercial printing and industrial labeling.

Ink compositions containing colorants used in inkjet printers can be classified as either pigment-based, in which the colorant exists as pigment particles suspended in the ink composition, or as dye-based, in which the colorant exists as a fully solvated dye species that includes one or more dye molecules. Pigments are highly desirable since they are far more resistant to fading than dyes. However, pigment-based inks have a number of drawbacks. Great lengths are undertaken to reduce a pigment particle to a sufficiently small particle size and to provide sufficient colloidal stability to the particles. Pigment-based inks often require a lengthy milling operation to produce particles in the sub-micron range needed for most modern ink applications. If the pigment particles are too large light scattering can have a detrimental effect on optical density and gloss in the printed image.

A second drawback of pigmented inks is their durability after printing, especially under conditions where abrasive forces have been applied to the printed image. Pigment-based inks typically reside at the surface of the imaging receiver to which they are printed and this makes the printed images particularly susceptible to abrasive forces. To this extent, pigmented inks have been formulated with various polymers, dispersants, and other addenda to provide durable images that can withstand post printing physical abuse and environmental conditions.

The degree of abrasion resistance of a printed image is also a function of time after printing. At short time intervals after printing, typically from a few minutes to a few hours, the ink undergoes several complex dynamic changes. As the ink contacts the receiver, some of the components penetrate into the receiver and the droplets can simultaneously spread laterally on the receiver surface. Carrier fluids such as water and humectants are drawn into the receiver by capillary forces and the polymer binders begin to film form. At short time intervals the binder film formation is incomplete and the resulting pigment cake is particularly susceptible to abrasive forces. Typically, the more total fluid that is printed to the receiver (and hence more water) the longer it takes for the ink to dry and form a durable image. The abrasion resistance of the image is further affected by the presence of humectants, which are employed for optimal firing performance, but which are retained in the pigment cake for some period of time. Since most humectants have much lower vapor pressures than water, they are relatively slow to evaporate and can be retained in the image receiver for several hours. Humectants can have the effect of plasticizing the polymer binder and making the surface of the image tacky or softer than if no humectant was present. Once the humectants evaporate, the resulting pigment cake, consisting primarily of pigment and binders, reaches a steady state composition, and determines the long-term abrasion resistance of the printed image.

Images printed from an inkjet printer are also susceptible to abrasive forces as the image receiver is advanced through the printer. Typically, there is some mechanism for advancing the print past the printhead and out of the printer. In some designs a spur wheel is used to advance the printed receiver. Spur wheels are often made from a hard plastic or metal and have the shape of a disk with points or spurs located on the periphery of the wheel. The spurs contact the printed receiver and can physically penetrate the uppermost area of the printed image leaving behind a small hole. In extreme cases the spurs can plow into the receiver and tear off small sections of the imaged areas. In either case, the mechanical abrasion caused by the spur wheel occurs at short time intervals on the order of a few seconds after printing and results in a defect that is objectionable to the eye. Further, in some cases, the incomplete polymer binder film formation results in a tacky surface that can stick to such surfaces within the printer that transport the printed image.

Pigmented inks for inkjet printing have been formulated with acrylic polymers; however, the acrylic polymers alone are insufficient in providing durable images that resist scratches and other forms of physical abuse. A second class of polymers that have been used as abrasion resistance additives in pigment-based inks are the polyurethanes, or urethane resins as they are sometimes called. U.S. Pat. No. 6,136,890 discloses a pigment-based inkjet ink wherein the pigment particles are stabilized by a polyurethane dispersant. US Publication No. 2004/0242726 discloses a pigment dispersed by a cross-linking step between a resin having a urethane bond and a second water-soluble polymer.

Although polyurethanes are known for their excellent abrasion resistance, they also have a number of drawbacks. For example, not all polyurethane polymers are conducive to jetting from a thermal inkjet head. In particular, water-dispersible polyurethane particles, such as those disclosed in U.S. Pat. Nos. 6,533,408 and 6,268,101, Statutory Invention Registration No. US H2113H, and US Publication Numbers 2004/0130608 and 2004/0229976 are particularly difficult to jet from a thermal inkjet printhead at high tiring frequencies. It is highly desirable to fire inks at high firing frequencies from an inkjet printer since this is one variable that controls the speed at which the image can be printed.

Another way to improve the abrasion resistance of a printed image is to apply a clear ink as an overcoat to the image. The clear inks, also known as overcoat solutions or colorless ink compositions, are typically formulated with polymer, water, and other components commonly used in aqueous-based inkjet ink formulations, for example, humectants, organic solvents, surfactants, and biocides. US Publication Numbers 2006/0100306 and 2006/0100308 disclose the use of polyurethanes and mixtures of polyurethanes and acrylic polymers having specified acid numbers for use in clear ink compositions. Clear inks formulated with polyurethanes, however, also suffer from the same short term durability issues as colored inks since they have many components in common with their colored ink counterparts. In addition, the application of a clear ink increases the total amount of water applied to the receiver and therefore slows down the drying of the imaged area of the prints. Although the application of clear ink can improve the long term durability, its application can adversely affect the short term durability due to the increased water load on the receiver.

Both pigment and clear inks can be difficult to jet through inkjet printheads having small nozzle diameters especially by the thermal inkjet printing process. In recent years, thermal inkjet printers have moved to higher jetting frequencies and smaller nozzle diameters to provide faster printing speeds with higher image quality. Thermal inkjet printers are now capable of printing (in drop volumes of 3 picoliters or less) at jetting frequencies in excess of 10 kHz and the need for higher velocity firings is a highly desirable feature. However, this high frequency firing often comes at the cost of variability in the firing velocity, which leads to poor image quality in the final printed image. In addition, the demands of current thermal inkjet printing require that the nozzles fire for a large number of firings during the life-time of a printer. As an example, a typical inkjet nozzle may be required to fire in excess of $5 \times 10^7$, and up to as many as $1 \times 10^9$, individual firing events without malfunctioning or ceasing to fire altogether. Thus, although polyurethane binders have found use in inkjet inks there remains the need to provide inkjet printing fluids, including both pigment-based and clear inkjet inks, capable of providing durable images and which satisfy the demands of high frequency thermal inkjet printing.

Continuous inkjet (CIJ) printers typically consist of two main components, a fluid system and one or more printheads. Ink is delivered through a supply line from a supply reservoir to a manifold that distributes the ink to a plurality of orifices, typically arranged in linear array(s), under sufficient pressure to cause ink streams to issue from the orifices of the printhead. Stimulations are applied to the printhead to cause those ink streams to form streams of spaced droplets, which are deflected into printing or non-printing paths. The non-printing droplets are returned to the supply reservoir via a droplet catcher and a return line. U.S. Pat. Nos. 4,734,711 and 5,394,177 and EP 1,013,450 describe in detail the design of a fluid system for CIJ apparatus. The more recent development of CIJ printing apparatus and printhead fabrication can be found in U.S. Pat. Nos. 6,588,888 and 6,943,037.

Ink drop uniformity requires maintaining a uniform pressure in the printhead cavity. U.S. Pat. No. 4,614,948 describes that a positive displacement pump, such as gear pump, is preferred for use as the ink supply pump. The need to limit pulsation produced by the pump is recognized in U.S. Pat. No. 4,971,527. In addition, filters are employed at appropriate locations in fluid system to remove oversized particles prior to ink entering into printhead orifices and avoid printhead clogging.

CIJ inks traditionally have been mostly aqueous dye-based inks, where issues regarding robust system runnability, such as easy start up/shut down, extended printing time without crooked jet, and reduced frequency for filter changing have been minimized. In such traditional dye-based inks, no particles are observable under the microscope. Although there have been many recent advances in the art of dye-based inkjet inks, such inks still suffer from deficiencies such as low optical densities on coated glossy paper and poor light-fastness. When water is used as the carrier, such inks also generally suffer from poor water fastness and poor smear resistance. Accordingly, the advantages associated with the use of pigmented inks would also be desirable for use in continuous inkjet printing systems.

It has been discovered, however, that severe filter plugging issues may be encountered when running pigment inks in a CIJ fluid system, requiring frequent change of filters, e.g., over the time period of a few hours vs. a few months for dye-based inks. The consequence of filter plugging is the loss of fluid pressure and fluid jets, leading to system shutdown. Further investigation has discovered that the gear pump commonly used in the fluid system to maintain fluid pressure with minimal pulsation can cause agglomeration of pigment particles, leading to filter clogging and system shutdown. Further, addition of polyurethanes can also substantially increase the viscosity of a printing fluid, and cause printing fluids to become destabilized upon recirculation, which may be especially undesirable for continuous inkjet printing applications. Therefore, there further exists a need for inkjet printing fluids, and in particular pigmented inkjet ink formulations comprising polyurethanes, which are stable in CIJ fluid systems.

SUMMARY OF THE INVENTION

It is an object of this invention to provide inkjet printing fluid compositions, including pigment-based inks and clear inks, containing an aqueous polyurethane binder that provides abrasion resistance to an image at both short time and long time intervals after printing. It is a further object to provide such printing fluids which can be jetted at high firing frequencies from an inkjet printhead. It is a further object of this invention to provide such printing fluids for CIJ printing systems which enable the ink to be recirculated in a CIJ fluid system for extended periods without significant pressure build up or filter clogging.

In accordance with one embodiment, the invention provides an inkjet printing fluid composition comprising water and a water dispersible polyurethane additive of the general formula of (I):

wherein Z is the central portion of a monomer unit that is the polymerization product of a diisocyanate; $X^1$—$Y^1$—$X^1$ represents one or more soft segments wherein $Y^1$ represents the central portion of a unit that is the polymerization product of a diamine or diol prepolymer having a molecular weight of greater than 300 Daltons; W is the central portion of one or more units containing an acid group; $X^2$—$Y^2$—$X^2$ represents one or more hard segments wherein $Y^2$ represents the central portion of a unit that is the polymerization product of a $C_2$-$C_8$ diol or diamine having a molecular weight of less than 250 Daltons; and $X^1$, V and $X^2$ can be the same or different and are an —O— or —N— atom; and further wherein the polyurethane additive has a weight average molecular weight of at least 6,000 Daltons and a sufficient number of acid groups to provide an acid number greater than 35, and the one or more $X^2$—$Y^2$—$X^2$ hard segments are present at from 1 wt % to less than 13 wt % of the polyurethane additive.

The invention further provides a method for printing an inkjet image comprising: I) providing an inkjet printing fluid according to the invention; and II) jetting the inkjet printing fluid in the form of ink drops onto a recording element to form a printed image.

BRIEF DESCRIPTION OF THE DRAWINGS

In the detailed description of the example embodiments of the invention presented below, reference is made to the accompanying drawings, in which.

DETAILED DESCRIPTION OF THE INVENTION

The inkjet printing fluids of the present invention are aqueous-based printing fluids. "Aqueous-based" is defined herein to mean the printing fluid comprises mainly water as the carrier medium for the remaining printing fluid components. In a preferred embodiment, the printing fluids of the present invention comprise at least about 50 weight percent water. In a specific embodiment, the printing fluid is a pigment-based ink. Pigment-based inks are defined as inks containing at least a dispersion of water-insoluble pigment particles. In a further embodiment, the printing fluid may be a clear ink. A clear ink in the present invention is defined as an ink composition that does not contain colorants, including colored pigments or colored dyes. The clear ink is typically aqueous based and can contain humectants and polymers used in the art of inkjet printing. The clear ink can be slightly colored due to the presence of humectants, polymers, or impurities, but is not intentionally colored by the addition of a colorant.

An ink set is defined as a set of two or more inks. An ink set may contain pigment-based inks of different colors, for example, cyan, magenta, yellow, red, green, blue, orange, violet, or black. In one embodiment, a carbon black pigmented ink is used in an ink set comprising at least three inks having separately, a cyan, a magenta, and a yellow colorant. Useful ink sets also include, in addition to the cyan, magenta, and yellow inks, complimentary colorants such as red, blue, violet, orange, or green inks. In addition, the ink set may comprise light and dark colored inks, for example, light cyan and light magenta inks commonly used in the ink sets of wide format printers. It is possible to include one or more inks that comprise a mixture of different colored pigments in the ink set. An example of this is a carbon black pigment mixed with one or more colored pigments or a combination of different colored pigments. An ink set may also include one or more pigment-based inks in combination with one or more clear inks. An ink set may also include at least one or more pigment-based inks in combination with additional inks that are dye-based ink. An ink set may further comprise one or more inks containing a self-dispersing carbon black pigment ink which is used primarily for printing of text and a plurality of cyan, magenta, yellow, and black inks which are used primarily for photographic quality printing.

Printing fluid compositions of the present invention comprise at least one water-dispersible polyurethane compound. "Water-dispersible" is defined herein to mean individual polymer molecules or colloidal assemblies of polymer molecules which are stably dispersed in the printing fluid without the need for a dispersing agent. Water dispersible polyurethanes employed in the present invention have the general formula of (I):

wherein Z is the central portion of a monomer unit that is the polymerization product of a diisocyanate; $X^1$—$Y^1$—$X^1$ represents one or more soft segments wherein $Y^1$ represents the central portion of a unit that is the polymerization product of a diamine or diol prepolymer having a molecular weight of greater than 300 Daltons; W is the central portion of one or more units containing an acid group; $X^2$—$Y^2$—$X^2$ represents one or more hard segments wherein $Y^2$ represents the central portion of a unit that is the polymerization product of a $C_2$-$C_8$ diol or diamine having a molecular weight of less than 250 Daltons; and $X^1$, V and $X^2$ can be the same or different and are an —O— or —N— atom. The polyurethane additive has a weight average molecular weight of at least 6,000 Daltons, and a sufficient number of acid groups to provide an acid number greater than 35, and the one or more $X^2$—$Y^2$—$X^2$ hard segments are present at from 1 wt % to less than 13 wt % of the polyurethane additive.

Z in the above formula (I) is typically a hydrocarbon group having a valence of two, more desirably containing a substituted or unsubstituted alicyclic, aliphatic, or aromatic group, preferably represented by one or more of the following structures:

$X^1$—$Y^1$—$X^1$ in the above formula (I) represents one or more soft segments wherein $Y^1$ represents the central portion of a unit that is the polymerization product of a diamine or diol prepolymer having a molecular weight of greater than 300 Daltons, preferably from about 400 to 20,000 Daltons. Such soft segments may be derived from, e.g., a polyether polyol, polyester polyol, polycarbonate polyol, polydimethyl siloxane diol, polyether diamine, polyester diamine, polycarbonate diamine, or aminoalkyl terminated polydimethyl siloxane. Useful polyether diols and diamines are those sold under the trade name TERATHANE from Dupont and trade name JEFFAMINE D, ED, and M series from Huntsman. A useful polycarbonate polyol is poly(hexamethylene carbonate) diol from Arch Chemical. A particularly useful polyether polyol useful for forming the soft segment is tetramethylene glycol and can desirably have a molecular weight between 300 and 2500. A particularly useful polyether diamine is a bis(3-aminopropyl) terminated polytetrahydrofuran having a molecular weight between 600 and 2000. Additional useful soft segments for the polyurethane include a polydimethylsiloxane diol or aminoalkyl terminated polydimethyl siloxane, and fluorinated prepolymers comprising fluorinated side chains. Useful fluorinated side chains include fluoroalkyls and fluorinated polyethers. Fluorinated soft segments may be similarly introduced into the polyurethane backbone by using a prepolymer with both ends terminated with a hydroxyl (diol) or an amino (diamine) group. Polyurethane additives employed in the present invention may comprise a mixture of two or more distinct soft segments. The $X^1$—$Y^1$—$X^1$ soft segments are preferably present in the polyurethane at from about 1% to 75% by weight, more preferably from 2% to 70%, and desirably from 5% to 60% based on the total weight of the polymer.

W is preferably the central portion of a monomeric unit containing a phosphoric acid, carboxylic acid, or sulfonic acid group, most preferably being carboxylic acids, such as 2,2'-bis(hydroxymethyl)propionic acid, 2,2'-bis(hydroxymethyl)butyric acid, and hydroxyethylether of 4,4'-bis(4-hydroxyphenyl)valeric acid.

$X^2$—$Y^2$—$X^2$—$X^2$ represents one or more hard segments present at from 1 wt % to less than 13%, preferably 5 to 11%, of the polyurethane additive, wherein $Y^2$ represents the central portion of a unit that is the polymerization product of a $C_2$-$C_8$ diol or diamine having a molecular weight of less than 250 Daltons. Such hard segments preferably comprise the polymerization product of a $C_2$-$C_8$ diol, e.g., ethylene glycol, 1,3-propane diol, 1,4-butane diol, 1,5-pentanediol, 1,6-hexane diol, 2-methyl 1,3-propane diol, 3-methyl 1,5-pentane diol, or cyclohexane dimethanol, most preferably 1,4-butanediol.

Conventional processes of making polyurethane dispersions involve the steps of preparing a prepolymer having a relatively low molecular weight and a small excess of isocyanate groups and chain-extending with a chain extender the prepolymers into a high molecular weight polyurethane during the dispersion process. Besides the raw materials the polyurethane dispersions sold by various manufacturers differs in the process used to prepare the prepolymers (e.g Solvent free prepolymer process, Ketimine and Ketazine process, Hybrid system, and Ethyl acetate process), and the type of chain extender used in the dispersion step. Such materials and processes have been disclosed in, for example, U.S. Pat. No. 4,335,029; in "Aqueous Polyurethane Dispersions," by B. K. Kim, Colloid & Polymer Science, Vol. 274, No. 7 (1996) 599-611, Steinopff Verlag 1996; and in "Polyurethane Dispersion Process," by Manea et al., Paint and Coating Industry, January 2007, Page 30.

The polyurethane dispersions useful for the practice of this invention are desirably to be prepared without involving the chain-extension step during the dispersion step. Instead it is preferable to have the chemical reaction for forming urethane or urea linkages completed prior to the dispersion step. This will insure that the polyurethane dispersions used in the printing fluid compositions of the invention have well-controlled molecular weight and molecular weight distribution and be free of gel particles.

In one particularly useful process the polyurethane used in the present invention is prepared in a water miscible organic solvent such as tetrahydrofuran, followed by neutralizing the hydrophilic groups, e.g. carboxylic acid groups, with an organic amine, e.g., dimethylethanol amine or triethanol amine, or aqueous inorganic base, e.g. potassium hydroxide solution. The polyurethane solution is then diluted with doubly distilled de-ionized water. Finally the water miscible organic solvent is removed by distillation to form stable polyurethane dispersions. In this process the polyurethane particles are formed by precipitation during solvent evaporation.

In a second desirable process the polyurethane useful for the invention is prepared in a water immiscible organic solvent, e.g. ethyl acetate. The polyurethane is neutralized with an organic amine, e.g., dimethylethanol amine or triethanol amine, or aqueous inorganic base and water is added to form an aqueous dispersion comprising primarily minute drops of polyurethane-water immiscible organic solvent solution suspended in water. The water immiscible organic solvent is then removed to form the desired polyurethane dispersion.

In another desirable process the polyurethane is formed by a sequential polymerization process where a soft polyurethane segment is formed first by reacting a diisocyanate compound with a polyether diol or diamine. The soft polyurethane segment then reacts further with a mixture of diisocyanate compound, a hard segment polyol, and a low molecular weight diol having a hydrophilic group, e.g. a carboxylic acid group.

The polyurethane of this invention has a sufficient amount of acid groups in the molecule to make the polymer usable in an aqueous based printing fluid. In one embodiment the polyurethane has an acid number of greater than 35. The acid number is defined as the milligrams of potassium hydroxide required to neutralize one gram of dry polymer. The acid number of the polymer may be calculated by the formula given in the following equation: Acid number=(moles of acid monomer)*(56 grams/mole)*(1000)/(total gams of monomers) where, moles of acid monomer is the total moles of all acid group containing monomers that comprise the polymer, 56 is the formula weight for potassium hydroxide, and total grams of monomers is the summation of the weight of all the monomers, in grams, comprising the target polymer.

In order to achieve optimal jetting from a drop-on-demand thermal inkjet printhead while maintaining durability, the acid number is typically from 65 to 135, more desirably from 75 to 120, and most desirably from 80 to 120.

In a particular embodiment, printing fluid compositions of the invention are designed specifically for use in printing systems comprising a printing fluid applicator and a recirculating printing fluid supply supplying the printing fluid to the applicator, such as a continuous inkjet printer. In such CIJ printers, a main fluid supply is provided with the aqueous printing fluid composition, which is then delivered from the main fluid supply to a printhead, where a continuous stream of the ink composition is ejected from the printhead, which continuous stream then is broken into spaced droplets. In response to electrical signals received from a control mechanism, the droplets are then selected between printing droplets for marking a substrate and nonprinting droplets that are collected and returned to the main fluid supply, as described more fully in U.S. Pat. Nos. 4,734,711, 5,394,177, 6,588,888, 6,943,037, 4,614,948 and 4,971,527, and EP 1,013,450, the disclosures of which are incorporated by reference herein. In contrast to drop-on-demand printing, CIJ is a very high speed printing process, and it is desired to operate at substrate transport speeds in excess of 200 m/min. Printing speed alone imposes some limitations on ink formulation relative to slower drop-on-demand printing techniques, simply on the basis of the short time requirements for adequately drying the printed substrate moving at full speed in the press before roll wind-up. Surprisingly, features of CIJ printhead operation can allow wider ink formulation latitude than is possible in DOD printing in other respects, however. Ink formulation considerations specific to traditional CIJ printing are described in W. Wnek, *IEEE Trans.* 1986, 1475-81, which elucidates the ink performance requirements for drop formation, deflection and catching of non-printing drops, recirculation of the ink to the printhead from the storage reservoir for future printing, and also for commercial ink-media image quality and durability. In order to achieve improved durability and water resistance for printed images in continuous inkjet systems, while maintaining dispersion stability, use of polyurethanes of formula (I) with an acid number of from 40 to 100 (more preferably 50 to 95, and most preferably 50 to 70) are preferably employed.

The acid groups on the polyurethane compounds employed in the present invention are at least partially neutralized (converted into salts) using organic amine, e.g., dimethylethanol amine or triethanol amine, or monovalent inorganic base, preferably an alkaline metal hydroxide selected from the group of potassium hydroxide, sodium hydroxide, rubidium hydroxide, or lithium hydroxide. In a preferred embodiment, at least 70 percent of the available acid groups on the polymer are converted into salts using inorganic base, more preferably, at least 90% of the available acid groups are converted. From a manufacturing perspective, preferably less than 100% of the acid groups are neutralized as this can lead to lack of control of the pH of the printing fluids.

The polyurethanes employed in the invention have a minimum weight average molecular weight of at least 6,000 Daltons, more preferably at least 8,000 Daltons. Desirably, the polyurethane has a maximum weight average molecular weight of 150,000. Polyurethanes having too low molecular weight may provide insufficient durability and often exhibit poor jetting performance. For improved durability and optical density, a weight average molecular weight of at least 25,000 is preferred for use in continuous inkjet systems. Molecular weights above 150,000, on the other hand, may have negative impacts on the relatively low viscosity requirements of an inkjet printing fluid which are desirably jetted at high frequencies and with low variability. More typically the molecular weight of polyurethanes employed in the invention is from 10,000 to 100,000, more desirably from 15,000 to 70,000. The polyurethane dispersions useful for the practice of this invention preferably have a mean particle size of less than 100 nm.

Printing fluid compositions, both pigment-based and clear, can comprise polyurethanes of the present invention at levels from 0.1 to 20% by weight based on the total printing fluid components. More desirable abrasion resistance can be imparted to the inkjet images when the printing fluid composition contains from 0.5 to 15% by weight of inventive polyurethane. For drop-on-demand thermal printhead systems, polyurethane concentrations of from 0.1% to 5%, more preferably 0.5 to 3%, based on the total printing fluid composition may be employed. These ranges of polyurethane provide excellent jetting of the printing fluid composition from the printhead while minimizing viscosity effects that could affect jetting performance. For continuous inkjet printing systems, polyurethane concentrations of from 1% to 15%, more preferably 2 to 12%, and in one particular embodiment between 5% and 10%, based on the total printing fluid composition may be employed. These ranges provide improved durability of printed images, and improved recirculation stability for the printing fluid.

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for device utility. Suitably, a substituent group may be halogen or may be bonded to the remainder of the molecule by an atom of carbon, silicon, oxygen, nitrogen, phosphorous, sulfur, selenium, or boron. The substituent may be, for example, halogen, such as chloro, bromo or fluoro; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di pentylphenoxy)butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl) ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecyl-benzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen, sulfur, phosphorous, and boron, such as 2-furyl, 2-thienyl, 2-benzimidazolyloxy or 2-benzothiazolyl; quaternary ammonium, such as triethylammonium; quaternary phosphonium, such as triphenylphosphonium; and silyloxy, such as trimethylsilyloxy.

If desired, the substituents may themselves be further substituted one or more times with the described substituent groups. The particular substituents used may be selected by those skilled in the art to attain desirable properties for a specific application and can include, for example, electron-withdrawing groups, electron-donating groups, and steric groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected.

Pigment-based ink compositions employing non-self-dispersed pigments that are useful in pigmented printing fluids of the invention may be prepared by any method known in the art of inkjet printing. Useful methods commonly involve two steps: (a) a dispersing or milling step to break up the pigments to desirable particle size, and (b) a dilution step in which the pigment dispersion from step (a) is diluted with the remaining printing fluid components to give a working strength ink. The milling step (a) is carried out using any type of grinding mill such as a media mill, a ball mill, a two-roll mill, a three-roll mill, a bead mill, an air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to desired particle size. Inert milling media include such materials as polymeric beads, glasses, ceramics, metals and plastics as described, for example, in U.S. Pat. No. 5,891,231. Milling media are removed from either the pigment dispersion obtained in step (a) or from the ink composition obtained in step (b).

A dispersant is present in the milling step (a) in order to facilitate break up of the pigments. For the pigment dispersion obtained in step (a) or the ink composition obtained in step (b), a dispersant is present in order to maintain particle stability and prevent settling. The dispersant for the pigment particles can be a surfactant, such as for example, potassium oleylmethyl taurate (KOMT), sodium dodecyl sulfate or sodium dioctyl sulfosuccinate.

Polymeric dispersants can be used to disperse the pigment particles prior to, or during the milling step. Typically, these polymeric dispersants are copolymers made from hydrophobic and hydrophilic monomers. Examples of polymeric dispersants for pigment particles include random and block copolymers having hydrophilic and hydrophobic portions; see for example, U.S. Pat. Nos. 4,597,794, 5,085,698, 5,519,085, 5,272,201, 5,172,133, and 6,043,297, and PCT Patent Publication Number WO 2004/111140A1; and graft copolymers; see for example, U.S. Pat. Nos. 5,231,131, 6,087,416, 5,719,204, and 5,714,538. Among these polymeric dispersants anionic polymeric dispersants are especially useful.

Polymeric dispersants useful for dispersing the pigment particles employed in the present invention are not limited in the arrangement of the monomers comprising the dispersant. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Polymeric dispersants useful for dispersing the pigment particles can be selected from acrylics and styrene-acrylics. Styrene-acrylic polymeric dispersants especially useful in the present invention are copolymers of styrenic monomers and carboxylate monomers. Examples of such dispersants include copolymers of styrene or alphamethyl styrene and acrylic acid or methacrylic acid (such as the JONCRYL BASF or TRUDOT Mead Westvaco polymers) or styrene maleic anhydride and styrene maleic anhydride amic acid copolymers (such as SMA-1440, SMA-17352, SMA-1000, SMA-2000 Sartomer Inc.).

Acrylic polymeric dispersants useful in the present invention are typically formed from one or more acrylic monomer and one or more ionizable monomer, such as, for example carboxyalted or sulfonated monomers. Acrylic polymeric dispersants are typically formed from one or more hydrophobic acrylate monomer including, for example, methylmethacrylate, ethylmethacrylate, butylmethacrylate, hexylmethacryate, octylmethacrylate and decylmethacrylate.

Other especially useful polymeric dispersants are those where the hydrophobic monomer is selected from benzyl methacrylate or acrylate, or from acrylic acid esters containing an aliphatic chain having twelve or more carbons and where the hydrophilic monomer is a carboxylated monomer. Examples of acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, and decyltetradecyl methacrylate. Preferably the methacrylate or acrylate monomer is stearyl or lauryl methacrylate or acrylate. The hydrophobic portion of the polymer may be prepared from one or more of the hydrophobic monomers. Desirable carboxylated hydrophilic monomers are acrylic acid or methacrylic acid, or combinations thereof.

Typically, the weight average molecular weight of the polymeric dispersant has an upper limit such that it is less than 50,000 Daltons. Desirably the weight average molecular weight of the copolymer is less than 25,000 Daltons; more desirably it is less than 15,000 and most desirably less than 10,000 Daltons. The copolymer dispersants preferably have a weight average molecular weight lower limit of greater than 500 Daltons.

In one exemplary embodiment, the pigment particles are dispersed with a copolymer where the hydrophobic monomer is benzyl methacrylate and is present from 50 weight percent to 80 weight percent relative to the total weight of the polymeric dispersant and the hydrophilic monomer is methacrylic acid.

In a second embodiment, copolymer dispersants are employed which comprise a hydrophobic monomer having a carbon chain length of greater than or equal to 12 carbons present in an amount of at least 10% by weight of the total copolymer, and more desirably greater than 20% by weight, an optional additional hydrophobic monomer comprising an aromatic group and a hydrophilic monomer that is methacrylic acid. For example, the additional aromatic group containing monomer may be benzyl acrylate or benzyl methacrylate. An especially useful additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more typically from about 0 to 60%, and desirably from about 0 to 50%. A particularly useful embodiment of a polymeric dispersant for the pigment particles is a terpolymer of benzyl methacrylate, stearyl methacrylate and methacrylic acid. Particularly useful polymeric pigment dispersants are further described in US Patent Publication Numbers 2006/0012654 and 2007/0043144, the disclosures of which are incorporated by reference herein.

Encapsulating type polymeric dispersants and polymeric dispersed pigments thereof can also be used in the invention. Specific examples are described in U.S. Pat. Nos. 6,723,785, 6,852,777, and US Patent Publication Numbers 2004/0132942, 2005/0020731, 2005/0009951, 2005/0075416, 2005/0124726, 2004/0077749, and 2005/0124728. Encapsulating type polymeric dispersants can be especially useful because of their high dispersion stability on keeping and low degree of interaction with ink components. Composite colorant particles having a colorant phase and a polymer phase are also useful in aqueous pigment-based printing fluids of the invention. Composite colorant particles are formed by polymerizing monomers in the presence of pigments; see for example, US Patent Publication Numbers 2003/0199614, 2003/0203988, or 2004/0127639. Microencapsulated-type pigment particles are also useful and consist of pigment particles coated with a resin film; see for example U.S. Pat. No. 6,074,467.

The pigment particles useful in the invention may have any particle size that can be jetted through a printhead. Preferably, the pigment particles have a volume weighted mean particle size of less than about 0.5 micron. The pigment dispersions useful in pigment-based printing fluid compositions of the present invention desirably have a median particle diameter of less than 200 nm and more desirably less than 150 nm. In a particularly useful embodiment, 90 percent of the weight of the pigment particles in the distribution have a diameter less than 150 nm and desirably less than 100 nm.

Self-dispersing pigments, i.e., pigments that are dispersible without the use of a separate dispersant or surfactant, useful for the practice of the invention are those that have been subjected to a surface treatment such as oxidation/reduction, acid/base treatment, or functionalization through coupling chemistry. The surface treatment can render the surface of the pigment with anionic, cationic, or non-ionic groups. The preparation and use of covalently functionalized self-dispersed pigments suitable for inkjet printing are reported by Bergemann et al. in U.S. Pat. No. 6,758,891 and U.S. Pat. No. 6,660,075; Belmont in U.S. Pat. No. 5,554,739; Adams and Belmont in U.S. Pat. No. 5,707,432; Johnson and Belmont in U.S. Pat. No. 5,803,959 and U.S. Pat. No. 5,922,118; Johnson et al. in U.S. Pat. No. 5,837,045; Yu et al. in U.S. Pat. No. 6,494,943; in published applications WO 96/18695, WO 96/18696, WO 96/18689, WO 99/51690, WO 00/05313, and WO 01/51566; Osumi et al. in U.S. Pat. No. 6,280,513 and U.S. Pat. No. 6,506,239; Karl et al. in U.S. Pat. No. 6,503,311; Yeh, et al. in U.S. Pat. No. 6,852,156; Ito et al. in U.S. Pat. No. 6,488,753; and Momose et al. in EP 1,479,732. Examples of commercially available self-dispersing type pigments include CAB-O-JET 200, CAB-O-JET-250, CAB-O-JET-260, CAB-O-JET-270, and CAB-O-JET 300 (Cabot Specialty Chemicals, Inc.); BONJET CW-1, CW-2 and CW-3 (Orient Chemical Industries, Ltd.); and AQUA BLACK 162 and 001 (Tokai Carbon, Ltd.).

A wide variety of organic and inorganic pigments, alone or in combination with additional pigments or dyes, can be in the present invention. Pigments that may be used in the invention include those disclosed in, for example, U.S. Pat. Nos. 5,026,427; 5,085,698; 5,141,556; 5,160,370; and 5,169,436. The exact choice of pigments will depend upon the specific application and performance requirements such as color reproduction and image stability. Dispersed pigment particles are typically present at from 1 to 10 wt % in the pigmented inkjet printing fluids of the invention, preferably 1 to 6 wt %. Pigments suitable for use in the invention include, but are not limited to, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of organic pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; and C.I. Pigment Brown 1, 5, 22, 23, 25, 38, 41, 42.

Printing fluid compositions, both pigment-based and clear, useful in the invention may also preferably comprise a humectant in order to achieve reliable firing at high frequency with low velocity variability. Representative examples of humectants which may be employed in the present invention include: (1) triols, such as; glycerol, 1,2,6-hexanetriol, 2-ethyl-2-hydroxymethyl-propane diol, trimethylolpropane, alkoxlated triols, alkoxylated pentaerythritols, saccharides, and sugar alcohols; and (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol or a mixture thereof. Desirable humectants are polyhydric alcohols having three or more hydroxyl groups. A particularly useful humectant is glycerol.

Typical aqueous-based ink compositions for drop-on-demand thermal printhead systems useful in the invention may contain, e.g., 5-35 weight percent humectant(s), especially from 6-25% humectant, most desirably from about 7-20% humectant. Inks comprising humectants having the aforementioned viscosity and concentration ranges are ideal for maintaining ink viscosities in an acceptable range for high speed firing from a thermal inkjet printhead with low variability in firing velocity. While higher levels may be typically preferred for use in drop-on-demand printers, the total humectant level of printing fluid compositions for CIJ printing is desirably 10% or less by weight, more preferably 8% or less by weight, and most preferably 6% or less by weight. A preferred range of humectant for CIJ printing fluids is from 0.5 to about 8% by weight, more preferably from 0.5 to about 6% by weight. The total humectant level of the ink is the sum of the individual sources of humectant ingredients, which may include humectant added directly during ink formulation, and for example humectant associated with a commercial biocide preparation as a supplemental ingredient, or with a commercial pigment dispersion preparation that may be present to prevent so-called "paint-flakes" of dried pigment cake forming around a bottle cap, as described in US Patent publication No. 2005/0075415 to Harz et al. More desirably, the total humectant level is from about 1% to less than 10%, in order to facilitate drying of the inkjet printing recording material in a high speed printer while simultaneously encouraging higher equilibrium moisture content in dried ink film on hardware for redispersion and clean-up by ink, or by start-up and shut-down fluids, or by a printhead storage fluid.

The printing fluid compositions of the present invention may also include a water miscible co-solvent or penetrant. Representative examples of co-solvents used in the aqueous-based printing fluid compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols; such as ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds, such as urea, 2-pyrrolidinone, N-methyl-2-pyrrolidinone, imidazolidinone, and 1,3-dimethyl-2-imidazolidinone; and (4) sulfur-containing compounds, such as 2,2'-thiodiethanol, dimethyl sulfoxide, and tetramethylene sulfone. Typical aqueous-based printing fluid compositions useful in the invention may contain 2-15 weight percent co-solvent(s).

The pH of the aqueous printing fluid compositions of the invention may be adjusted by the addition of organic or inorganic acids or bases. Inorganic bases are preferred; however, small amounts of organic bases, such as triethanolamine, may be used to adjust the pH of the printing fluid. Useful printing fluids for drop-on-demand applications may have a preferred pH of from about 4 to 10, depending upon the type of pigment being used. Preferably, the pH of such printing fluid is from 6 to 9, more preferably from 7 to 9. The pH of the inkjet ink composition directed at CU is desirably adjusted from about 7 to about 12; more desirably, the pH is about 8 to 10. When the ink composition is used in hardware with nickel or nickel-plated apparatus components, an anticorrosion inhibitor such as the sodium salt of 4- or 5-methyl-1-H-benzotriazole is desirably added and the pH adjusted to be from about 10 to about 11. When the ink composition is used with printheads with components fabricated from silicon that are in contact with the fluid, the ink composition pH is desirably adjusted to be from about 7 to about 9.5; more desirably, the pH ranges from about 7.5 to about 9. In order to reduce the risk of excessively protonating carboxylate anions associated with polymeric dispersants and anionic charge stabilized anti-abrasion polymers that might render the ink composition more susceptible to flocculation, pH levels lower than about 7 are desirably avoided. With hardware components fabricated from silicon in contact with the ink composition, pH levels higher than about 10 can induce significant rates of etch and corrosion that may impair the operation of the device over time. Typical inorganic acids include nitric, hydrochloric, phosphoric, and sulfuric acids. Typical organic acids include methanesulfonic, acetic, formic, and lactic acids. Typical inorganic bases include alkali metal hydroxides and carbonates. Typical organic bases include ammonia, triethanolamine, and tetramethylethlenediamine. Amine bases especially desirable in the application of the invention to CIJ printing include 3-amino-1-propanol, N,N-dimethanolamine, N,N-dimethylethanolamine, N,N-diethylethanolamine, and triethanolamine. The well known Goods buffers can also be employed.

The inks of the invention may contain surfactants added to adjust the static surface tension or dynamic surface tension of the ink to an appropriate level. The surfactants may be anionic, cationic, amphoteric, or nonionic and used at, e.g., levels of 0.01 to 5% of the ink composition. Defoaming agents comprised of phosphate esters, polysiloxanes, or acetylenic diols may further optionally be used with the ink compositions directed at CIJ to reduce foam formation caused by the fluid agitation associated with drop catching and ink recirculation.

The pigment-based and clear printing fluid compositions of the present invention may also contain a water-soluble acrylic polymer comprising carboxylic acid groups. The term "water-soluble" is defined herein as when the polymer is dissolved in water and when the polymer is at least partially neutralized with an inorganic monovalent base the resultant solution is visually clear.

The monomers for the water-soluble acrylic polymer can be selected from methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, α-methyl styrene, t-butyl styrene, vinyl toluene, butadiene, isoprene, N,N-dimethyl acrylamide, acrylic acid, methacrylic acid, chloromethacrylic acid, maleic acid, and derivatives thereof. Examples of suitable monomers include allyl compounds such as allyl esters (e.g., allyl acetate, allyl caproate, etc.); vinyl ethers (e.g., methyl vinyl ether, butyl vinyl ether, methoxyethyl vinyl ether, ethoxyethyl vinyl ether, chloroethyl vinyl ether, 1-methyl-2,2-dimethylpropyl vinyl ether, hydroxyethyl vinyl ether, diethylene glycol vinyl ether, dimethylaminoethyl vinyl ether, butylaminoethyl vinyl ether, benzyl vinyl ether, tetrahydrofurfuryl vinyl ether, etc.); vinyl esters (such as vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, etc.); vinyl heterocyclic compounds (such as N-vinyl oxazolidone, N-vinylimidazole, N-vinylpyrrolidone, N-vinylcarbazole, vinyl thiophene, N-vinylethyl acetamide, etc.); styrenes (e.g., styrene, divinylbenzene, methylstyrene, dimethylstyrene, ethylstyrene, isopropylstyrene, sodium styrenesulfonate, potassium styrenesulfinate, butylstyrene, hexylstyrene, cyclohexylstyrene, benzylstyrene, chloromethylstyrene, trifluoromethylstyrene, acetoxymethylstyrene, acetoxystyrene, vinylphenol, (t-butoxycarbonyloxy) styrene, methoxystyrene, 4-methoxy-3-methylstyrene, dimethoxystyrene, chlorostyrene, dichlorostyrene, trichlorostyrene, bromostyrene, iodostyrene, fluorostyrene, methyl vinylbenzoate ester, vinylbenzoic acid, etc.); crotonic acids (such as crotonic acid, crotonic acid amide, crotonate esters (e.g., butyl crotonate, etc.)); vinyl ketones (e.g., methyl vinyl ketone, etc); olefins (e.g., dicyclopentadiene, ethylene, propylene, 1-butene, 5,5-dimethyl-1-octene, etc.); itaconic acids and esters (e.g., itaconic acid, methyl itaconate, etc.), other acids such as sorbic acid, cinnamic acid, methyl sorbate, citraconic acid, chloroacrylic acid mesaconic acid, maleic acid, fumaric acid, and ethacrylic acid; halogenated olefins (e.g., vinyl chloride, vinylidene chloride, etc.); unsaturated nitriles (e.g., acrylonitrile, etc.); acrylic or methacrylic acids and esters (such as acrylic acid, methyl acrylate, methacrylic acid, methyl methacrylate, ethyl acrylate, butyl acrylate, butyl methacrylate, 2-hydroxyethyl methacrylate, 2-acetoacetoxyethyl methacrylate, sodium-2-sulfoethyl acrylate, 2aminoethylmethacrylate hydrochloride, glycidyl methacrylate, ethylene glycol dimethacrylate, etc.); and acrylamides and methacrylamides (such as acrylamide, methacrylamide, N-methylacrylamide, N,N-dimethylacrylamide, N-isopropylacrylamide, N-s-butylacrylamide, N-t-butylacrylamide, N-cyclohexylacrylamide, N-(3-aminopropyl)methacrylamide hydrochloride, N-(3-dimethylaminopropyl)methacrylamide hydrochloride, N,N-dipropylacrylamide, N-(1,1-dimethyl-3-oxobutyl)acrylamide, N-(1,1,2-trimethylpropyl)acrylamide, N-(1,1,3,3-tetramethylbutyl)acrylamide, N-(1-phthalamidomethyl)acrylamide, sodium N-(1,1-dimethyl-2-sulfoethyl)acrylamide, N-butylacrylamide, N-(1,1-dimethyl-3-oxobutyl)acrylamide, N-(2-carboxyethyl)acrylamide, 3-acrylamido-3-methylbutanoic acid, etc.).

The water-soluble acrylic polymer can be prepared by emulsion polymerization, solution polymerization, or bulk polymerization technique well known in the art. Typically, the water-soluble acrylic polymer has a weight average molecular weight of less than 20,000. Desirably, the polymer has a sufficient number of acid groups such that the acid number of the polymer is greater than 115.

The acid groups on the acrylic polymers are at least partially neutralized (converted into salts) using monovalent inorganic bases, typically aqueous alkaline metal hydroxides, selected from: potassium hydroxide, sodium hydroxide, rubidium hydroxide, and lithium hydroxide. In a one particularly useful embodiment, at least 70 percent of the available acid groups on the polymer are converted into salts using monovalent inorganic base, more desirably at least 90% of the available acid groups are converted. Monovalent inorganic bases are highly preferred over organic bases such as amines as the neutralizing agents for the acrylic polymers since printing fluids containing acrylic polymers neutralized with organic amines show very poor jetting performance in a thermal inkjet printhead.

Acrylic polymers which may be employed in the present invention are exemplified by those disclosed in U.S. Pat. No. 6,866,379, which is incorporated herein in its entirety by reference. Specific examples of preferred water-soluble polymers useful in the present invention are copolymers prepared from at least one hydrophilic monomer that is an acrylic acid or methacrylic acid monomer, or combinations thereof. Preferably, the hydrophilic monomer is methacrylic acid.

Water-soluble polymers particularly useful in the printing fluid of the present invention are copolymers prepared from at least one hydrophobic monomer that is an (meth)acrylic acid ester. Examples of hydrophobic monomers include methyl (meth)acrylate, ethyl (meth)acrylate, butyl (meth)acrylate, octyl (meth)acrylate, decyl (meth)acrylate, lauryl(methacrylate), stearyl (meth)acrylate, benzyl (meth)acrylate, phenyl (meth)acrylate, and combinations thereof. Preferred hydrophobic monomers are benzyl (meth)acrylate.

The water-soluble polymer may also be a styrene-acrylic copolymer comprising a mixture of vinyl or unsaturated monomers, including at least one styrenic monomer and at least one acrylic monomer, at least one of which monomers has an acid or acid-providing group. Such polymers are disclosed in, for example, U.S. Pat. Nos. 4,529,787; 4,358,573; 4,522,992; and 4,546,160; the disclosures of which are incorporated herein by reference. Preferred polymers include, for example, styrene-acrylic acid, styrene-acrylic acid-alkyl acrylate, styrene-maleic acid, styrene-maleic acid-alkyl acrylate, styrene-methacrylic acid, styrene-methacrylic acid-alkyl acrylate, and styrene-maleic acid half ester, wherein each type of monomer may correspond to one or more particular monomers. Examples of preferred polymers include but are not limited to styrene-acrylic acid copolymer, (3-methyl styrene)-acrylic acid copolymer, styrene-methacrylic acid copolymer, styrene-butyl acrylate-acrylic acid terpolymer, styrene-butyl methacrylate-acrylic acid terpolymer, styrene-methyl methacrylate-acrylic acid terpolymer, styrene-butyl acrylate-ethyl acrylate-acrylic acid tetrapolymer, and styrene-(α-methyl styrene)-butyl acrylate-acrylic acid tetrapolymer.

The water-soluble acrylic polymer is not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer make take the form of a random terpolymer or an ABC triblock wherein, at least one of the A, B, and C blocks is chosen to be the hydrophilic monomer and the remaining blocks are hydrophobic blocks dissimilar from one another.

The water-soluble acrylic polymer useful in pigment-based printing fluids of the present invention is typically present at a concentration of greater than 0.6 weight percent based on the total weight of the printing fluid. In a useful embodiment of the present invention particularly for use with thermal printhead systems, the printing fluid composition comprises a polyurethane described above and a water-soluble acrylic polymer described above wherein, the ratio of total amount of polyurethane and acrylic polymer(s) to pigment is from 0.5 to 1.5 and the ratio of polyurethane polymer to acrylic polymer is from 0.5 to 2.

The exact choice of ink components will depend upon the specific application and performance requirements of the printhead from which they are to be jetted. Desirable viscosities are no greater than 10 cP, preferably in the range of 1.0 to 5.0 cP. Printing fluid compositions defined by these desirable embodiments are capable of achieving high firing frequencies with low variability for a large number of firing events.

Surfactants may be added to adjust the surface tension of the printing fluid to an appropriate level. In a particular embodiment, relative dynamic and static surface tensions of various pigment based printing fluids and clear protective printing fluid of an ink set may be controlled as described in US Publication Number 2008/0207805, the disclosure of which is incorporated by reference herein, to control intercolor bleed between the inks. The surfactants may be anionic, cationic, amphoteric, or nonionic and used at levels of 0.01 to 5% of the ink composition. Examples of suitable nonionic surfactants include, linear or secondary alcohol ethoxylates (such as the TERGITOL 15-S and TERGITOL TMN series available from Union Carbide and the BRIJ series from Uniquema), ethoxylated alkyl phenols (such as the TRITON series from Union Carbide), fluoro surfactants (such as the ZONYLS from DuPont; and the FLURADS from 3M), fatty acid ethoxylates, fatty amide ethoxylates, ethoxylated and propoxylated block copolymers (such as the PLURONIC and TETRONIC series from BASF, ethoxylated and propoxylated silicone based surfactants (such as the SILWET series from CK Witco), alkyl polyglycosides (such as the GLUCOPONS from Cognis), and acetylenic polyethylene oxide surfactants (such as the Surfynols from Air Products, Inc.).

Examples of anionic surfactants include carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates, and alkyl naphthalene sulfonates), phosphated (such as phosphated esters of alkyl and aryl alcohols, including the STRODEX series from Dexter Chemical), phosphonated and amine oxide surfactants, and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples of the above surfactants are described in "McCutcheon's Emulsifiers and Detergents," 1995, North American Edition.

A biocide (0.01-1.0% by weight) may also be added to prevent unwanted microbial growth which may occur in the printing fluid over time. A preferred biocide for the printing fluids employed in the present invention is PROXEL GXL (Zeneca Colours Co.) at a concentration of 0.05-0.1% by weight or/and KORDEK (Rohm and Haas Co.) at a concentration of 0.05-0.1% by weight (based on 100% active ingredient). Additional additives which may optionally be present in an inkjet printing fluid composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

The invention is summarized above. Inkjet printing systems useful in the invention comprise a printer, at least one printing fluid as described above, and an image recording element, typically a sheet (herein also "media"), suitable for receiving printing fluid from an inkjet printer. The method of the invention employs the inkjet printing system of the invention to provide an image on media. Inkjet printing is a non-impact method for producing printed images by the deposition of printing fluid droplets in a pixel-by-pixel manner to an image-recording element in response to digital data signals. There are various methods that may be utilized to control the deposition of printing fluid droplets on the image-recording element to yield the desired printed image.

Figure 1:
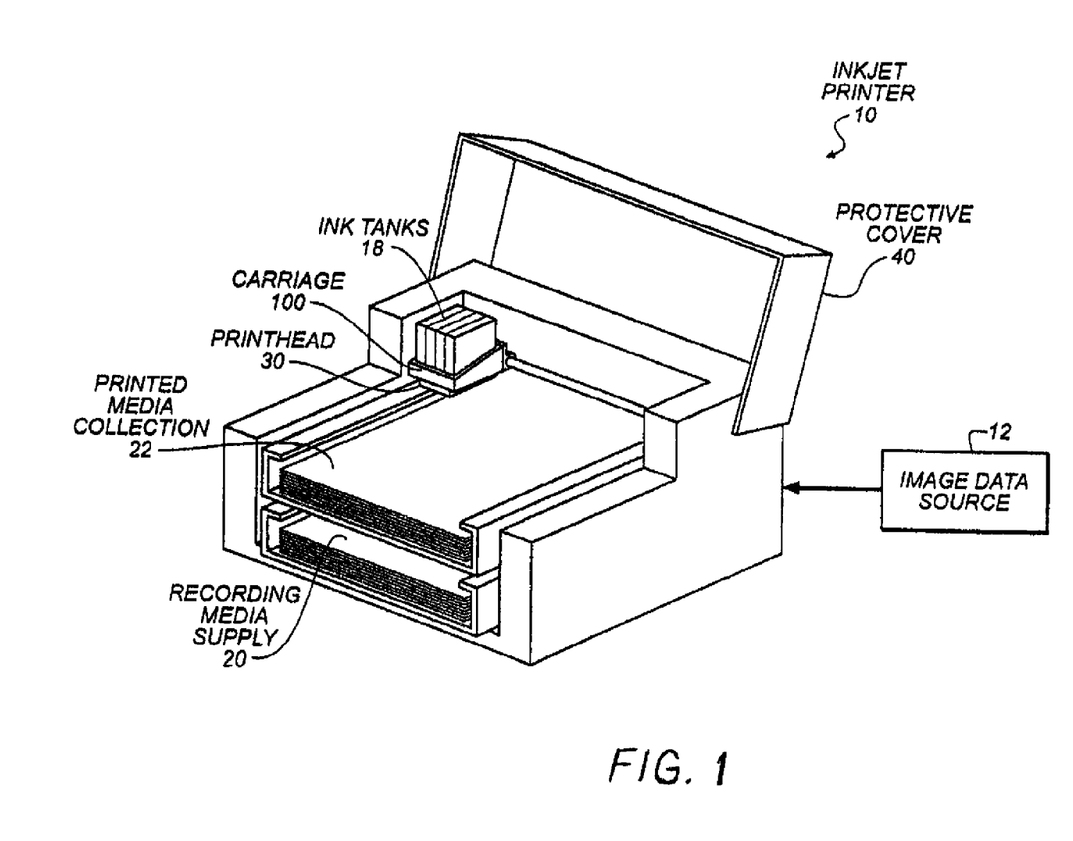
FIG. 1 is a schematic diagram of a drop-on-demand inkjet printing system employed in accordance with an embodiment of the present invention.

In one process, known as drop-on-demand inkjet, individual ink droplets are projected as needed onto the image-recording element to form the desired printed image. Common methods of controlling the projection of ink droplets in drop-on-demand printing include piezoelectric transducers, thermal bubble formation or an actuator that is made to move. FIG. 1 shows one schematic example of a drop-on-demand inkjet printer 10 that may be employed with printing fluids of the present invention. Printer 10 includes a protective cover 40 for the internal components of the printer. The printer contains a recording media supply 20 in a tray. The printer includes one or more ink tanks 18 (shown here as having four inks) that supply ink to a printhead 30. The printhead 30 and ink tanks 18 are mounted on a carriage 100. The printer includes a source of image data 12 that provides signals that are interpreted by a controller (not shown) as being commands to eject drops of ink from the printhead 30. Printheads may be integral with the ink tanks or separate. Exemplary printheads are described in U.S. Pat. No. 7,350,902. In a typical printing operation a media sheet travels from the recording media supply 20 in a media supply tray to a region where the printhead 30 deposits droplets of ink onto the media sheet. The printed media collection 22 is accumulated in an output tray.

In another process, known as continuous inkjet, a continuous stream of droplets is generated, a portion of which are deflected in an image-wise manner onto the surface of the image-recording element, while un-imaged droplets are caught and returned to an ink sump. In the method of continuous inkjet printing in accordance with one embodiment of the invention, a main fluid supply of a continuous inkjet printer is provided with an aqueous ink composition of the invention, and the ink composition is delivered from the main fluid supply to a printhead. A continuous stream of the ink composition is ejected from the printhead, which continuous stream is broken into spaced droplets. In response to electrical signals received from a control mechanism, the spaced droplets are controlled to select between printing droplets for marking a substrate and nonprinting droplets that are collected and returned to the main fluid supply. Continuous inkjet systems which may be used with printing fluids of the present invention include those disclosed in, e.g., U.S. Pat. Nos. 6,588,888, 6,554,410, 6,682,182, and 6,575,566 to Jeanmaire et al.; US Publication No. 2003/0202054 to Jeanmaire et al.; U.S. Pat. Nos. 6,793,328 and 6,866,370 to D. Jeanmaire; and U.S. Pat. No. 6,517,197 to Hawkins et al.; the disclosures of which are herein incorporated in their entirety by reference. In another preferred embodiment, a printing fluid for the invention is printed using an apparatus capable of controlling the direction of the formed printing and nonprinting drops by asymmetric application of heat to the fluid stream that initializes drop break-up and serves to steer the resultant drop, as disclosed in U.S. Pat. Nos. 6,079,821 and 6,505,921 to Chwalek et al., the disclosures of which are herein incorporated in their entirety by reference. Useful ink agitation, heated ink supply and printhead and fluid filtration arrangements for CIJ pigmented inkjet ink compositions are described in U.S. Pat. No. 6,817,705 to Crockett et al. Printer replenishing systems for maintaining ink quality and countering the effects of ink volatile component evaporation are described in U.S. Pat. No. 5,526,026 to M. Bowers and U.S. Pat. No. 5,473,350 to Mader et al., and EP 0 597 628 A1 to Loyd et al.

Figure 2:
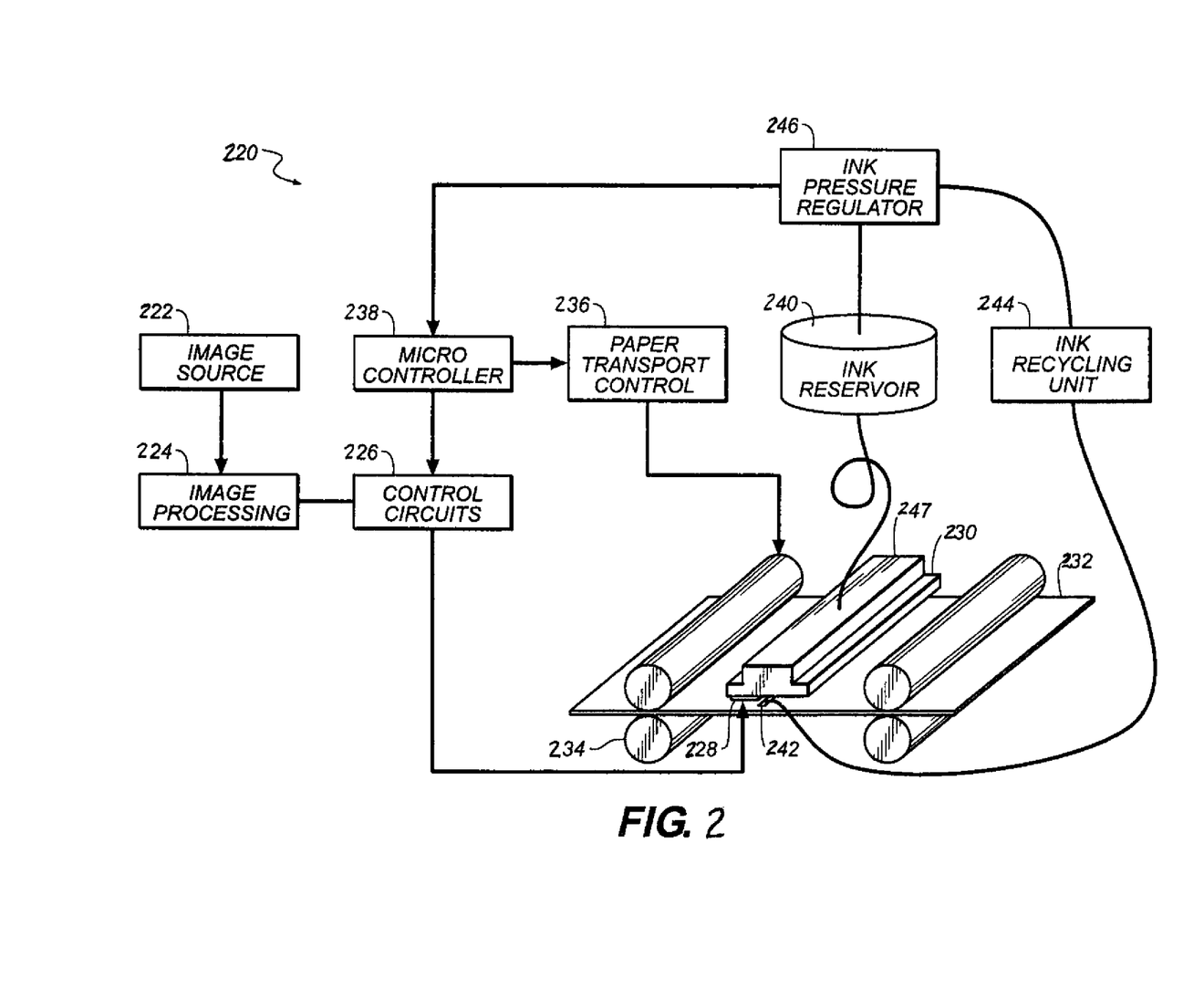
FIG. 2 shows a schematic diagram of a continuous inkjet printing system employed in accordance with an embodiment of the present invention.

Referring to FIG. 2, a continuous printing system 220 includes an image source 222 such as a scanner or computer which provides raster image data, outline image data in the form of a page description language, or other forms of digital image data. This image data is converted to half-toned bitmap image data by an image processing unit 224 which also stores the image data in memory. A plurality of drop forming mechanism control circuits 226 read data from the image memory and apply time-varying electrical pulses to a drop forming mechanism(s) 228 that are associated with one or more nozzles of a printhead 230. These pulses are applied at an appropriate time, and to the appropriate nozzle, so that drops formed from a continuous inkjet stream will form spots on a recording medium 232 in the appropriate position designated by the data in the image memory. Recording medium 232 is moved relative to printhead 230 by a recording medium transport system 234, which is electronically controlled by a recording medium transport control system 236, and which in turn is controlled by a micro-controller 238. The recording medium transport system shown in FIG. 2 is a schematic only, and many different mechanical configurations are possible. For example, a transfer roller could be used as recording medium transport system 234 to facilitate transfer of the ink drops to recording medium 232. Such transfer roller technology is well known in the art. In the case of page width printheads, it is most convenient to move recording medium 232 past a stationary printhead. However, in the case of scanning print systems, it is usually most convenient to move the printhead along one axis (the sub-scanning direction) and the recording medium along an orthogonal axis (the main scanning direction) in a relative raster motion.

Ink is contained in an ink reservoir 240 under pressure. In the non-printing state, continuous inkjet drop streams are unable to reach recording medium 232 due to an ink catcher 242 that blocks the stream and which may allow a portion of the ink to be recycled by an ink recycling unit 244. The ink recycling unit reconditions the ink and delivers it back to reservoir 240. Such ink recycling units are well known in the art. The ink pressure suitable for optimal operation will depend on a number of factors, including geometry and thermal properties of the nozzles and thermal properties of the ink. A constant ink pressure can be achieved by applying pressure to ink reservoir 240 under the control of ink pressure regulator 246. Alternatively, the ink reservoir can be left unpressurized, or even under a reduced pressure (vacuum), and a pump is employed to deliver ink from the ink reservoir under pressure to the printhead 230. In such an embodiment, the ink pressure regulator 246 can comprise an ink pump control system. As shown in FIG. 2, catcher 242 is a type of catcher commonly referred to as a "knife edge" catcher. The ink is distributed to printhead 230 through an ink channel 247. The ink preferably flows through slots or holes etched through a silicon substrate of printhead 230 to its front surface, where a plurality of nozzles and drop forming mechanisms, for example, heaters, are situated. When printhead 230 is fabricated from silicon, drop forming mechanism control circuits 226 can be integrated with the printhead. Printhead 230 also includes an ink drop deflection mechanism (not shown).

The following examples illustrate, but do not limit, the utility of the present invention.

Example 1

Synthesis of the Inventive Polyurethanes PU-1 through PU-19

PU-1:

In a round bottom flask equipped with thermometer, stirrer, water condenser, and a vacuum outlet was placed 77.16 g (0.1187 moles) of Terathane 650 polyether glycol having a average $M_n$=650 (Aldrich 25190-06-1, 48.56 g (0.3620 moles) of 2,2-bis(hydroxymethyl) propionic acid (DMPA), 22.69 g 90,2518 moles) of 1,4-butane diol, 350 g of ethyl acetate (EA), and 0.85 g of dibutyl tin dilaurate. The temperature was adjusted to 65° C., and when a homogeneous solution was obtained, 162.82 g (0.7523 moles) of isophorone diisocyanate (IPDI) was slowly added, followed by 10 mL EA. The temperature was raised to 78° C. and maintained overnight to complete the reaction. The reaction mixture was diluted with 65 g of isopropanol (IPA) before being neutralized with a mixture of 45.13 g of 45 wt. % KOH solution and 45 g of distilled water to achieve 100% stoichiometric ionization based on the amount of DMPA. Under high shear, 918 g of distilled water was added and EA and IPA were subsequently removed by heating under vacuum. The resultant aqueous dispersion was filtered and resulted in a solid concentration of about 26.53% and a pH value of about 6.3. The molecular weight of the dispersion is $M_w$=46000 and $M_n$=11200; and the acid number AN=65. The PU dispersion is designated as PU-1

Typical reaction conditions outlined above were used to prepare other polyurethane dispersions by varying the types and amount of Y1 and Y2 and the percent acid containing monomer. The PU dispersions prepared in accordance with the present invention all have a final solid concentration of about 25 to 35%. All were stable and were easy to filter. These dispersions are considered to be easily manufacturable.

TABLE 1

| ID | Y1 diol | wt % | Y2 diol | wt % | AN | Mw/Mn |
|---|---|---|---|---|---|---|
| PU-1 | Terathane 650 | 24.8 | 1,4 BD | 7.3 | 65 | 46000/11200 |
| PU-2 | Terathane 2000 | 30.1 | 1,4 BD | 7.3 | 65 | 42700/10500 |
| PU-3 | Terathane 1000 | 27.1 | 1,4 BD | 7.3 | 65 | 39200/10800 |
| PU-4 | Terathane 2000 | 42.8 | 1,4 BD | 3.2 | 65 | 57500/13100 |
| PU-5 | Terathane 2000 | 20.2 | 1,4 BD | 10.4 | 65 | 35300/10400 |
| PU-6 | Terathane 2000 | 38.9 | 1,4 BD | 7.2 | 50 | 49600/13600 |
| PU-7 | Terathane 2000 | 21.4 | 1,4 BD | 7.3 | 80 | 33800/8680 |
| PU-8 | Terathane 2000 | 10.5 | 1,4 BD | 7.2 | 100 | 44600/10200 |
| PU-9 | Terathane 2000 | 50.7 | 1,4 BD | 3.4 | 50 | 65900/16800 |
| PU-10 | Terathane 2000 | 29.6 | 1,4 BD | 10.1 | 50 | 42600/12500 |
| PU-11 | Terathane 2000 | 33.6 | 1,4 BD | 3.3 | 80 | 42100/11100 |
| PU-12 | Terathane 2000 | 12.6 | 1,4 BD | 10.1 | 80 | 23500/7940 |
| PU-13 | Terathane 2000 | 26.6 | 1,3 PD (1) | 7.4 | 65 | 49700/12200 |
| PU-14 | Terathane 2000 | 32.3 | 1,5 PD (2) | 7.3 | 65 | 51300/12000 |
| PU-15 | Terathane 2000 | 33.6 | 1,6 HD (3) | 7.4 | 65 | 59200/12200 |
| PU-16 | Terathane 2000 | 36.3 | CHDM (4) | 7.2 | 65 | 54300/13100 |
| PU-17 | PC diol 2000 (5) | 29.7 | 1,4 BD | 7.3 | 65 | 29200/8920 |

TABLE 1-continued

| ID | Y1 diol | wt % | Y2 diol | wt % | AN | Mw/Mn |
|---|---|---|---|---|---|---|
| PU-18 | PC diol 860 (6) | 26.5 | 1,4 BD | 7.3 | 65 | 33000/8580 |
| PU-19 | Terathane 2000 (7) | 30.1 | 1,4 BD | 7.3 | 65 | |

(1) 1,3 propane diol
(2) 1,5-pentane diol
(3) 1,6 hexane diol
(4) Cyclohexane dimethanol
(5) Polycarbonate diol with an average Mn = 2000
(6) Polycarbonate diol with an average Mn = 860
(7) Neutralized with dimethyl ethanol amine (DMEA)

Example 2

Synthesis of the Comparative Polyurethanes CPU-1 through CPU-9

CPU-1 through CPU-6 were prepared in a similar manner to the inventive examples. CPU-1 through CPU-4 do not contain any Y2 diol and are stable dispersions. CPU-5 and CPU-6 contained about 13% of 1,4 butane diol and the resultant dispersions were less stable as reflected by filter plugging or excessive amount of foam formed during solvent removing under vacuum. CPU-5 and CPU-6 are considered to be non-manufacturable.

CPU-7 was prepared in accordance with the recipe disclosed in U.S. Pat. No. 6,508,548. CPU-8 was prepared in accordance with the recipe disclosed in U.S. Pat. No. 6,533,408 (PU-2). CPU-9 was prepared in accordance with the recipe disclosed in U.S. Pat. No. 6,533,408 (PU-3). All three dispersions had to be diluted very significantly to lower solids for filtration. They are considered to be less manufacturable.

TABLE 2

| ID | Y1 diol | Wt % | Y2 diol | Wt % | AN | Mw/Mn |
|---|---|---|---|---|---|---|
| CPU-1 | Terathane 2000 | 44.1 | None | — | 80 | 64800/13900 |
| CPU-2 | Terathane 2000 | 52.7 | None | — | 65 | 56900/13400 |
| CPU-3 | Terathane 2000 | 61.4 | None | — | 50 | 126000/22000 |
| CPU-4 | PC diol 2000 | 70.8 | None | — | 35 | 23700/7610 |
| CPU-5 | Terathane 2000 | 4.6 | 1,4-BD | 13 | 80 | 26400/8450 |
| CPU-6 | Terathane 2000 | 19.8 | 1,4-BD | 13.4 | 50 | 32000/9700 |
| CPU-7 | PC diol 860 | 32.9 | 1,4-BD | 9.5 | 19 | 52500/12500 |
| CPU-8 | Tone 0260 (1) | 25.5 | 1,4-BD | 13 | 21 | 28300/9970 |
| CPU-9 | PC diol 860 | 24.9 | 1,4-BD | 12 | 19 | 42900/12800 |

(1) Tone 0260 polyester diol MW 3,000

Example 3

Preparation of Polymeric Dispersant P-1

A 5-liter, three-necked round bottom flask equipped with a mechanical stirrer, a reflux condenser, and a gas inlet was charged with 225 g of 1-methoxy-2-propanol and was sparged with nitrogen. Akzo-Nobel Chemicals, Inc., initiator Perkadox AMBN-GR (1.9 g) was added with stirring. A reactant reservoir was charged with 225 g of 1-methoxy-2-propanol, 23.4 g of 1-dodecanethiol, 203.5 g of benzyl methacrylate, 165.0 g of stearyl methacrylate, and 181.5 g of methacrylic acid, and the solution was degassed by nitrogen sparging. AMBN-GR (7.7 g) was added and mixed in. The reactor temperature was raised to 77° C. and the reactants were pumped from the reservoir at about 2.3 mL/min over a 360-min period. The reaction mixture was stirred for at least 12 h at about 77° C. The polymer was neutralized to completion with dimethylaminoethanol and stirred for 45 min. The reaction mixture was diluted with 2,580 g of water and filtered through a Pall Corp. Ultipleat polypropylene cartridge filter. The final polymer solution had a concentration of ca. 20 wt. % solids and its pH was 8.6. The weight average molecular weight was 9,070 Daltons.

Preparation of Pigment Black NIPEX 180 Dispersion PB-1

To a 2.5-gallon, 9-inch diameter and 12-inch deep, double-walled stainless steel mixing vessel containing four baffles is added water (1,273 g) and a solution of the Polymeric Dispersant P-1 (727 g of a 20.6 wt % solution). A nominal 4-inch, ring-style disperser impeller (Hockmeyer Equipment Corp. D-Blade) driven by a Charles Ross & Son Co. Model HSM-100LH-2 High Shear Mixer is centered 2 inches above the bottom of the mixing vessel, and stirring is initiated. Degussa GmbH. NIPEX 180 IQ carbon black pigment (500 g) is slowly integrated into the fluid. Milling media comprising beads of polystyrene resin (copolymer of styrene and divinylbenzene/ethylvinylbenzene mixture) with an average particle diameter of 50 micrometers (3,000 g) is added slowly while increasing impeller speed. The mixture is milled with an impeller blade tip speed of ca. 19 m/sec for about 20 h at an internal temperature of 25-35° C. Samples are periodically removed, diluted and filtered for particle size determination by a Microtrac, Inc., NANOTRAC 150 dynamic light scattering analyzer. When milling is complete, the dispersion/media milling mixture is further diluted with a solution of water (2,475 g) and Rohm and Haas Co. KORDEK MLX preservative (25 g) to a final pigment concentration of about 10% and theoretical dispersion batch size of 5000 g. The impeller is removed from the dispersion/media milling mixture, and a vacuum separator filter probe is immersed. The filter probe comprised a 0.25-inch ID TYGON plastic tubing connected to a sealed 2-inch length of 1.25-inch OD tubular, 38-micrometer screen (Johnson Screens, Inc.). A peristaltic pump is used to separate the dispersion from the milling media and it is subsequently filtered through a 0.3-micrometer removal efficiency Pall Corp. PROFILE II depth filter. Roughly 4 kg of dispersion is recovered, approximately 80% yield. The volume-weighted $50^{th}$ percentile particle size distribution diameter is about 62 nm, and the $95^{th}$ percentile particle size distribution diameter is about 110 nm.

Inventive Ink-PU-1 Through Ink-PU-19

Preparation Inventive Ink-PU-1

Inventive Ink-PU-1 was prepared according to the following ink formulation in Table 3 using PB-1.

TABLE 3

| Ingredient | Wt % |
|---|---|
| Pigment black Nipex 180 using PB-1 | 4.5 |
| Glycerol | 5 |
| Methyl diethanolamine | 0.6 |
| Cobratec TT-50S | 0.1 |
| Proxel GXL | 0.1 |
| PU-1 (Table 1) | 9 |
| DI water | Balance to 100% |

Inventive Ink-PU-2 through Ink-PU-19 were prepared in a similar manner to Ink-PU-1 except using PU-2 through PU-19 in Table 1.

Comparative Ink-PU-0 and Ink-CPU-1 through Ink-CPU-3

Comparative Ink-CPU-1 through CPU-3 were prepared in a similar manner to Ink-PU-1 except using CPU-1 through CPU-3 in Table 2.

Comparative Ink-PU-0 was prepared in a similar manner to Ink-PU-1 except without PU dispersion.

Evaluation of Ink Performance

Ink viscosity was measured using Paar Physica AMVn Rolling Ball Viscometer at 25° C. The result is shown in Table 4. Optical printing density was evaluated using the drawdown method. About 16.35 mL/m2 of inks were applied to a paper surface using #6 wire rod. The ink on the paper substrate was air dried. The optical density was measured using Greytag Macbeth Spectroscan. The results of the measurement are shown in Table 4.

TABLE 4

| Ink | Viscosity (mPa · s) | Optical Density |
| --- | --- | --- |
| Inventive Ink PU-1 | 2.64 | 1.40 |
| Inventive Ink PU-2 | 2.83 | 1.35 |
| Inventive Ink PU-3 | 2.65 | 1.38 |
| Inventive Ink PU-4 | 3.74 | 1.38 |
| Inventive Ink PU-5 | 2.74 | 1.41 |
| Inventive Ink PU-6 | 2.94 | 1.40 |
| Inventive Ink PU-7 | 2.96 | 1.34 |
| Inventive Ink PU-8 | 3.17 | 1.36 |
| Inventive Ink PU-9 | 3.32 | 1.25 |
| Inventive Ink PU-10 | 2.82 | 1.44 |
| Inventive Ink PU-11 | 3.27 | 1.33 |
| Inventive Ink PU-12 | 1.96 | 1.03 |
| Inventive Ink PU-13 | 3.34 | 1.40 |
| Inventive Ink PU-14 | 3.24 | 1.37 |
| Inventive Ink PU-15 | 3.71 | 1.42 |
| Inventive Ink PU-16 | 3.39 | 1.40 |
| Inventive Ink PU-17 | 2.71 | 1.39 |
| Inventive Ink PU-18 | 2.72 | 1.37 |
| Inventive Ink PU-19 | 3.60 | 1.33 |
| Comparative Ink CPU-1 | 7.65 | 1.36 |
| Comparative Ink CPU-2 | 4.27 | 1.19 |
| Comparative Ink CPU-3 | 4.88 | 1.35 |
| Comparative Ink-PU-0 | 1.43 | 1.05 |

The inventive inks containing aqueous polyurethane dispersions in accordance with the present invention had low ink viscosity (less than 4 mPa·s) The printed papers showed high optical density. Comparative Ink CPU-1 through Ink CPU-3 contained aqueous polyurethane dispersions which have no Y2 hard segment diols. These inks showed a significant increase in the viscosity. The Comparative Ink PU-0 contained no aqueous polyurethane dispersion. The printed paper showed very low optical density.

Example 4

Inventive Ink-PU-50

Ink-PU-50 was prepared using PB-1 and PU-6 having an acid number of about 50 according to formulation in Table 5.

TABLE 5

| Ingredient | Wt % |
| --- | --- |
| Pigment black Nipex 180 using PB-1 | 4.5 |
| Glycerol | 4.5 |
| Ethylene glycol | 2.5 |
| Cobratec TT-50S | 0.1 |
| Proxel GXL | 0.1 |
| Surfynol 440 | 0.06 |
| PU-6 (Table 1) | 7.5 |
| Surfynol DF-110 | 0.08 |
| DI water | Balance to 100% |

Ink-PU-65, Ink-PU-80, and Ink-PU-100 were prepared in a similar manner to Ink-PU-50 except using PU-2, PU-7 and PU-8 in Table 1. PU-2 has an acid number of about 65. PU-7 has an acid number of about 80, and PU-8 has an acid number of about 100.

Ink-CPU-19 and Ink-CPU-35 were prepared in a similar manner to Ink-PU-50 except using CPU-9 and CPU-4 in Table 2. CPU-4 has no Y2 hard segment diol and an acid number of about 35, and CPU-9 has an acid number of about 19.

Evaluation: Recirculation of the Inks 125 mL of the above ink prepared were run through a system capable of in-line monitoring of the destabilization of the ink. This system comprised a small reservoir to contain the ink sample, a gear pump, and a filter holder, all connected in a recirculation loop. Reservoir volume was 125 mL. The gear pump used was a Micropump Model 180. The filter used was a 1.2 µm pore size Versapor disk filter. The recirculation flow rate was 1 L/min with a pressure approximately 45 to 50 psi at the start. The initial difference in the pressure is primarily caused by differences in ink viscosity. To simulate a continuous printing process, it is desirable to have ink keep recirculating through the gear pump with minimal change in the recirculation pressure. The testing results are shown in Table 6.

TABLE 6

| | Recirculation Time (hr) | | | |
| --- | --- | --- | --- | --- |
| Example | 1 | 5 | 10 | 15 |
| Ink-PU-50 | 45 psi | 46.4 psi | 45.8 psi | 45.7 psi |
| change % | | 3.11% | 1.78% | 1.56% |
| Ink-PU-65 | 48 psi | 49 psi | 50.4 psi | 51 psi |
| change % | | 2.08% | 5.00% | 6.25% |
| Ink-PU-80 | 51.7 psi | 54.3 psi | 56.5 psi | 57 psi |
| change % | | 5.03% | 9.28% | 10.25% |
| Ink-PU-100 | 49 psi | 48.5 psi | 51 psi | 55 psi |
| change % | | −1.02% | 4.08% | 12.24% |
| Ink-CPU-35 | 49.4 psi | 54.6 psi | 58 psi | 64.4 psi |
| change % | | 10.53% | 17.41% | 30.36% |
| Ink-CPU-19 | Failed immediately | | | |

Ink-CPU-19 using CPU-9 was prepared in accordance with the recipe disclosed in U.S. Pat. No. 6,533,408 (PU-3). The ink failed the recirculation test immediately. Ink-CPU-35 was prepared with CPU-4 dispersion having no Y2 diol segment and an acid number of 35. It showed a significant increase in recirculation pressure. On the other hand, minimal recirculation pressure change was observed for inks prepared with PU dispersions in accordance with the present invention.

Example 5

Acrylic Polymer AC-1

100 g of diethylene glycol (DEG) and 0.25 g of 2,2'-azobisisobutyronitrile (AIBN) were charged in a 1 L, three-neck round-bottomed flask equipped with a mechanical stirrer and nitrogen inlet. The resulting solution was purged with nitrogen for 20 min and heated to 150° C. in a constant temperature bath. In a separate vessel, 100 g of DEG, 0.25 g of ABIN, 33.5 g of benzyl methacrylate (BM), and 16.5 g of methacrylic acid (MA) were combined, mixed well, and added to the first solution over 2 h. Polymerization was continued for 3 h. The temperature was then reduced to 65-70° C., and 1 mL each of t-butyl hydroperoxide (10 weight percent aqueous) and sodium formaldehyde bisulfite (10 weight percent aqueous) were added. The resulting polymer was isolated as a 20 wt % aqueous solution by neutralizing the polymer to 70% of the stoichiometric acid number of 215 using potassium hydroxide. The resulting random copolymer of BM/MA is a 67/33- weight ratio with a weight average molecular weight of about 8000 and a number average molecular weight of about 5000.

Magenta Pigment Dispersion M-1:

Magenta dispersion M-1 was prepared in a similar manner to PB-1 except using PR122 red pigment and potassium N-methyl-N-oleoyl taurate (KOMT). The KOMT was used at about 30% based an the weight of the PR122. The resultant dispersion had a solids content of about 10% based on the pigment.

Inventive PU-20 Through PU-28

Preparation of Inventive PU-20

In a 1-liter round bottom flask equipped with thermometer, stirrer, water condenser, and a vacuum outlet was placed 15.6 g of poly(hexamethylene carbonate) diol (PHMC), avg. $M_n$=2000 (Aldrich 46, 116-4). It was dewatered under vacuum at 100° C. The vacuum was released and the following were added at 40° C. while stirring: 38.58 g 2,2-bis (hydroxymethyl) propionic acid (DMPA), 11.3 g of 1,4-butane diol, and 100 g tetrahydrofuran (THF). The temperature was adjusted to 65° C., and when a homogeneous solution was obtained, 88 g of isophorone diisocyanate (IPDI) was slowly added, followed by 10 mL THF. The temperature was raised to 75° C. and maintained for about 16 hours to complete the reaction, resulting in an intermediate containing less than 3% of free IPDI. The free IPDI content was monitored by IR spectroscopy of the absorption peak at 2240 $cm^{-1}$. The reaction mixture was neutralized with 32.27 g of 45 wt. % KOH solution to achieve 90% stoichiometric ionization based on the amount of DMPA. Under high shear, 450 mL of distilled water was added and THF was subsequently removed by heating under vacuum to give an aqueous solution of PU-20 at 25.3 wt. % solids. The molecular weights of PU-20 was measured at $M_w$=15,100 and $M_n$=5700; and the AN=105.

Inventive PU-21 through PU-31 were prepared in a similar manner to PU-20 except with the compositions as listed in Table 7

TABLE 7

| ID | Y1 diol | wt % | Y2 diol | wt % | AN | Mw/Mn |
|---|---|---|---|---|---|---|
| PU-20 | PC diol 2000 | 10.2 | 1,4-BD | 7.4 | 105 | 15100/5780 |
| PU-21 | PC diol 2000 | 20.6 | 1,4-BD | 3.9 | 105 | 11900/4640 |
| PU-22 | PC diol 2000 | 2 | 1,4-BD | 10.1 | 105 | 12800/5260 |
| PU-23 | PC diol 2000 | 4.3 | EG | 7.1 | 105 | 9900/4460 |
| PU-24 | PC diol 2000 | 8.1 | 1,3-PD | 7.2 | 105 | 11700/4850 |
| PU-25 | PC diol 2000 | 12.1 | 1,5-PD | 7.4 | 105 | 12800/5080 |
| PU-26 | PC diol 2000 | 13.9 | 1,6-HD | 7.3 | 105 | 13500/5430 |
| PU-27 | PC diol 2000 | 16.1 | CHDM | 7.3 | 105 | 13400/5150 |
| PU-28 | PC diol 2000 | 19 | 1,4-BD | 7.2 | 90 | 13000/5130 |
| PU-29 | PC diol 2000 | 32.9 | 1,4-BD | 5.1 | 76 | 16200/5730 |
| PU-30 | PC diol 2000 | 27.1 | 1,4-BD | 7.1 | 76 | 14600/5420 |
| PU-31 | PC diol 2000 | 20.9 | 1,4-BD | 9.1 | 76 | 14800/5710 |

Comparative CPU-10 and CPU-11

Comparative CPU-10 and CPU-11 were prepared in a similar manner to PU-20 except with the compositions as listed in Table 8.

TABLE 8

| ID | Y1 diol | wt % | Y2 diol | Wt % | AN | Mw/Mn |
|---|---|---|---|---|---|---|
| CPU-10 | PC diol 2000 | 48.5 | None | — | 76 | 19000/6060 |
| CPU-11 | PC diol 2000 | 32.2 | None | — | 105 | 17100/5860 |

Ink Preparation

Into an approximately 150 ml high density polyethylene bottle with magnetic stirring, the following components were added in order: high purity water, 8 wt % of glycerol, 5 wt % of ethylene glycol, 0.05 wt % of triethanolamine, 0.5 wt % of Surfynol 465 surfactant, 1.2 wt % of polyurethane as listed in Table 7 (Inventive Ink-PU-XX) or Table 8 (Comparative Ink-CPU-XX), 0.90 wt % of acrylic polymer AC-1, and 0.02 wt % of the biocide Kordek MLX biocide. The magenta pigment dispersion M-1 was added to provide a pigment level of 3.0 wt %. The resulting 120 g of ink was stirred for at least an hour and filtered with a 1.0 μm pore size disk filter.

Evaluation of Jetting Performance

A fraction of each ink preparation was placed in a high density polyethylene bottle and incubated at 85° C. for two weeks (2wk80C). The remaining ink was held at room temperature (RT). The inks were then jetted with a thermal inkjet printhead on a fixture fitted with a drop detection laser that allows the velocity of each drop to be accurately determined up to firing frequencies of about 27 kHz. The velocity and the velocity variation expressed as the coefficient of variation can be determined for each ink. These values are then compared for the incubated and non-incubated inks and a velocity change and velocity variation change after incubation are determined for each ink. The results are tabulated below in Table 9.

TABLE 9

| Ink | PU | Keeping condition | Velocity | Velocity COV | velocity change %* | Velocity COV Change %** |
|---|---|---|---|---|---|---|
| Ink-PU-20 | PU-20 | RT | 18.24 | 1.16 | | |
| | | 2 wk 80 | 19.16 | 1.15 | 5.0 | −0.5 |
| Ink PU-21 | PU-21 | RT | 15.56 | 0.99 | | |
| | | 2 wk 80 | 14.08 | 1.22 | −9.5 | 23.9 |
| Ink-PU-22 | PU-22 | RT | 19.38 | 1.16 | | |
| | | 2 wk 80 | 18.96 | 1.20 | −2.1 | 3.3 |
| Ink-PU-23 | PU-23 | RT | 19.23 | 1.22 | | |
| | | 2 wk 80 | 18.74 | 1.06 | −2.6 | −12.8 |
| Ink-PU-24 | PU-24 | RT | 18.66 | 1.18 | | |
| | | 2 wk 80 | 18.43 | 1.17 | −1.2 | −1.2 |
| Ink-PU-25 | PU-25 | RT | 17.90 | 1.13 | | |
| | | 2 wk 80 | 19.17 | 1.09 | −4.0 | −4.0 |
| Ink-PU-26 | PU-26 | RT | 16.80 | 1.18 | | |
| | | 2 wk 80 | 18.19 | 1.21 | 8.3 | 3.2 |
| Ink-PU-27 | PU-27 | RT | 16.91 | 1.18 | | |
| | | 2 wk 80 | 15.92 | 1.06 | −5.0 | 4.0 |
| Ink-PU-28 | PU-28 | RT | 13.97 | 1.54 | | |
| | | 2 wk 80 | 13.81 | 1.66 | −1.2 | 7.8 |
| Ink-PU-29 | PU-29 | RT | 14.53 | 1.21 | | |
| | | 2 wk 80 | 10.56 | 2.81 | −27.4 | 132.4 |
| Ink-PU-30 | PU-30 | RT | 12.49 | 2.17 | | |
| | | 2 wk 80 | 9.55 | 3.82 | −23.6 | 76.3 |
| Ink-PU-31 | PU-31 | RT | 13.65 | 1.64 | | |
| | | 2 wk 80 | 11.27 | 2.68 | −17.4 | 60.5 |
| Ink-CPU-10 | CPU-10 | RT | 15.53 | 1.04 | | |
| | | 2 wk 80 | 10.25 | 3.28 | −34 | 216.7 |
| Ink-CPU-11 | CPU-11 | RT | 18.44 | 0.86 | | |
| | | 2 wk 80 | 14.28 | 1.43 | −22.6 | 65.9 |

*change in velocity for ink kept at 2 wk 80 C. relative to that at RT.
**change in the coefficient of velocity variation for ink kept at 2 wk 80 C. relative to that at RT.

The inventive inks described in Table 9 have less velocity loss than the comparative inks made with polyurethanes of similar acid number but containing no Y2 hard segment diol, and preferred drop-on-demand printing fluid compositions employing polyurethanes having an acid number between 80 and 120 have a velocity loss of less than 10% and a velocity COV increase of less than 25% after incubation for two weeks at 80° C. The comparative inks show much larger velocity losses, accompanied by velocity variation increases in some cases over 200%.

The invention claimed is:

1. An inkjet printing fluid composition comprising water and a water dispersible polyurethane additive of the general formula of (I):

wherein Z is the central portion of a monomer unit that is the polymerization product of a diisocyanate; $X^1$—$Y^1$—$X^1$ represents one or more soft segments wherein $Y^1$ represents the central portion of a unit that is the polymerization product of a diamine or diol prepolymer having a molecular weight of greater than 300 Daltons; W is the central portion of one or more units containing an acid group; $X^2$—$Y^2$—$X^2$ represents one or more hard segments wherein $Y^2$ represents the central portion of a unit that is the polymerization product of a $C_2$-$C_8$ diol or diamine having a molecular weight of less than 250 Daltons; and $X^1$, V and $X^2$ can be the same or different and are an —O— or —N— atom; and further wherein the polyurethane additive has a weight average molecular weight of at least 6,000 Daltons and a sufficient number of acid groups to provide an acid number greater than 35, and the one or more $X^2$—$Y^2$—$X^2$ hard segments are present at from 1 wt % to less than 13 wt % of the polyurethane additive.

2. The inkjet printing fluid of claim 1, further comprising a humectant.

3. The inkjet printing fluid of claim 1, further comprising a colorant.

4. The inkjet printing fluid of claim 3, wherein the colorant comprises dispersed pigment particles.

5. The inkjet printing fluid of claim 4, wherein the pigment particles are dispersed with a polymeric dispersant.

6. The inkjet printing fluid of claim 4, wherein the pigment particles are dispersed with a surfactant.

7. The inkjet printing fluid of claim 4, wherein the pigment particles are self dispersed without the need for a separate dispersant.

8. The inkjet printing fluid of claim 4, wherein the pigment particles are present at a weight concentration of from 1 to 10 wt %, the polyurethane additive has an acid number of from 40 to 100, and the polyurethane additive is present at a weight concentration greater than that of the pigment.

9. The inkjet printing fluid of claim 8, further comprising at most 10 wt % of humectants and wherein the polyurethane additive has an acid number of from 50 to 95.

10. The inkjet printing fluid of claim 4, wherein the pigment particles are present at a weight concentration of from 1 to 10 wt %, the polyurethane additive has an acid number of from 65 to 130, and the polyurethane additive is present at a weight concentration less than that of the pigment.

11. The inkjet printing fluid of claim 10, further comprising at least 5 wt % of humectants and wherein the polyurethane additive has an acid number of from 80 to 120.

12. The inkjet printing fluid of claim 1, wherein the soft segment comprises a polycarbonate, polyester, or polyether prepolymer.

13. The inkjet printing fluid of claim 1 wherein the soft segment has a weight average molecular weight between 400 and 20,000 Daltons.

14. The inkjet printing fluid of claim 1, wherein the hard segment is present at between 5 to 11% by weight of the total polyurethane polymer.

15. The inkjet printing fluid of claim 1, wherein the $X^2$—$Y^2$—$X^2$ hard segment comprises the polymerization product of a $C_2$-$C_8$ diol.

16. The inkjet printing fluid of claim 1, wherein the $X^2$—$Y^2$—$X^2$ hard segment comprises the polymerization product of 1,4-butanediol.

17. The inkjet printing fluid of claim 1, wherein the acid groups on the polyurethane are at least partially neutralized using a monovalent inorganic base.

18. The inkjet printing fluid of claim 17, wherein at least 70% of the available acid groups on the polyurethane are neutralized with a monovalent inorganic base.

19. A method for printing an inkjet image comprising:
I) providing an inkjet printing fluid according to claim 1; and
II) jetting the inkjet printing fluid in the form of ink drops onto a recording element to form a printed image.

20. The inkjet printing fluid of claim 1, wherein the hard segment is present at from 5 to less than 13% by weight of the total polyurethane polymer.

* * * * *